United States Patent
Viard et al.

(10) Patent No.: US 11,370,196 B2
(45) Date of Patent: Jun. 28, 2022

(54) REINFORCEMENT MATERIAL COMPRISING A POROUS LAYER MADE OF PARTIALLY CROSS-LINKED THERMOPLASTIC POLYMER AND ASSOCIATED METHODS

(71) Applicant: HEXCEL REINFORCEMENTS SASU, Dagneux (FR)

(72) Inventors: Andréa Viard, Villemoirieu (FR); Thibaut Benethuiliere, Lyons (FR)

(73) Assignee: HEXCEL REINFORCEMENTS SASU, Dagneux (FR)

(*) Notice: Subject to any disclaimer, the term of this patent is extended or adjusted under 35 U.S.C. 154(b) by 202 days.

(21) Appl. No.: 16/762,104

(22) PCT Filed: Nov. 20, 2018

(86) PCT No.: PCT/FR2018/052925
§ 371 (c)(1),
(2) Date: May 6, 2020

(87) PCT Pub. No.: WO2019/102136
PCT Pub. Date: May 31, 2019

(65) Prior Publication Data
US 2020/0353717 A1 Nov. 12, 2020

(30) Foreign Application Priority Data
Nov. 22, 2017 (FR) ........................................ 1761056

(51) Int. Cl.
*B32B 5/26* (2006.01)
*B32B 7/09* (2019.01)
(Continued)

(52) U.S. Cl.
CPC ............... *B32B 5/26* (2013.01); *B32B 3/10* (2013.01); *B32B 5/022* (2013.01); *B32B 7/027* (2019.01);
(Continued)

(58) Field of Classification Search
CPC ...................................................... B32B 5/26
See application file for complete search history.

(56) References Cited

U.S. PATENT DOCUMENTS

| | | | |
|---|---|---|---|
| 4,515,848 A * | 5/1985 | Leunig | D04H 3/011 264/DIG. 48 |
| 6,503,856 B1 | 1/2003 | Broadway et al. | |

(Continued)

FOREIGN PATENT DOCUMENTS

| | | |
|---|---|---|
| EP | 1591468 A1 | 11/2005 |
| EP | 1125728 B1 | 10/2011 |

(Continued)

OTHER PUBLICATIONS

International Search Report (ISR) for International Application No. PCT/FR2018/052925, dated Feb. 19, 2019.

(Continued)

*Primary Examiner* — Andrew T Piziali
(74) *Attorney, Agent, or Firm* — W. Mark Bielawski

(57) ABSTRACT

The present invention relates to a reinforcement material including at least one fiber reinforcement associated on at least one of its faces with a porous layer, the porous layer(s) representing no more than 10% of the total weight of the reinforcement material, preferably from 0.5 to 10% of the total weight of the reinforcement material, and most preferably from 2 to 6% of the total weight of the reinforcement material, characterized in that the porous layer contains a partially cross-linked thermoplastic polymer. Another object of the invention is a precursor material of such a reinforce- (Continued)

ment material, as well as their preparation method and the methods for manufacturing a preform or a composite part from such materials.

10 Claims, 11 Drawing Sheets

(51) Int. Cl.
*B32B 7/027* (2019.01)
*B32B 3/10* (2006.01)
*B32B 5/02* (2006.01)
*B32B 7/12* (2006.01)
*B32B 27/12* (2006.01)
*B32B 27/34* (2006.01)
*B32B 37/06* (2006.01)
*C08F 283/00* (2006.01)

(52) U.S. Cl.
CPC .............. *B32B 7/09* (2019.01); *B32B 7/12* (2013.01); *B32B 27/12* (2013.01); *B32B 27/34* (2013.01); *B32B 37/06* (2013.01); *C08F 283/00* (2013.01); *B32B 2250/24* (2013.01); *B32B 2262/0261* (2013.01); *B32B 2262/106* (2013.01); *B32B 2264/0264* (2013.01); *B32B 2307/704* (2013.01)

(56) References Cited

U.S. PATENT DOCUMENTS

| | | | |
|---|---|---|---|
| 7,435,693 B2 | 10/2008 | Tsotsis et al. | |
| 8,361,262 B2 | 1/2013 | Tsotsis et al. | |
| 8,829,350 B2 | 9/2014 | Iwasaki et al. | |
| 9,099,225 B2 | 8/2015 | Pagliuca | |
| 9,371,604 B2 | 6/2016 | Wockatz | |
| 9,528,012 B2 | 12/2016 | Chretien et al. | |
| 2003/0161976 A1 | 8/2003 | Broadway et al. | |
| 2004/0137208 A1 | 7/2004 | Mitani et al. | |
| 2008/0289743 A1 | 11/2008 | Tsotsis et al. | |
| 2010/0003881 A1 | 1/2010 | Tsotsis | |
| 2012/0264342 A1* | 10/2012 | Boogh | C08L 77/02 525/190 |
| 2015/0375461 A1* | 12/2015 | Blackburn | D04H 3/04 156/181 |

FOREIGN PATENT DOCUMENTS

| | | |
|---|---|---|
| EP | 2491175 B1 | 11/2016 |
| WO | 2000/058083 A1 | 10/2000 |
| WO | 2006/121961 A1 | 11/2006 |
| WO | 2007/015706 A1 | 2/2007 |
| WO | 2007/034679 A1 | 3/2007 |
| WO | 2010/046609 A1 | 4/2010 |
| WO | 2010/061114 A1 | 6/2010 |
| WO | 2011/048340 A2 | 4/2011 |
| WO | 2011/113751 A1 | 9/2011 |
| WO | 2014/095838 A1 | 6/2014 |
| WO | 2014/139796 A1 | 9/2014 |

OTHER PUBLICATIONS

T. Czvikovsky, et al., "Electron beam surface modifications in reinforcing and recycling of polymers," Nuclear Instruments and methods in physics research section B, vol. 131, Issues 1-42, Aug. 1997, pp. 300-304.

* cited by examiner

[Key to Figure 1: 1. Cross-linkable thermoplastic porous layer; 2. Reinforcement material; 3. Thermoplastic polymer chains; 4. Partial cross-linking; 5. Partially cross-linked polymer chains]

[Key to Figure 3: 1. LEVEL OF CROSS-LINKING; 2. DOSE OF BETA IRRADIATION (KGY); 3. On the web alone; 4. On the webbed UD material]

[Key to Figure 7: 1. RTM6 alone; 2. RTM6 + HX2632 web 100kGy Beta; 3. RTM6 + non-cross-linked HX2352 web]

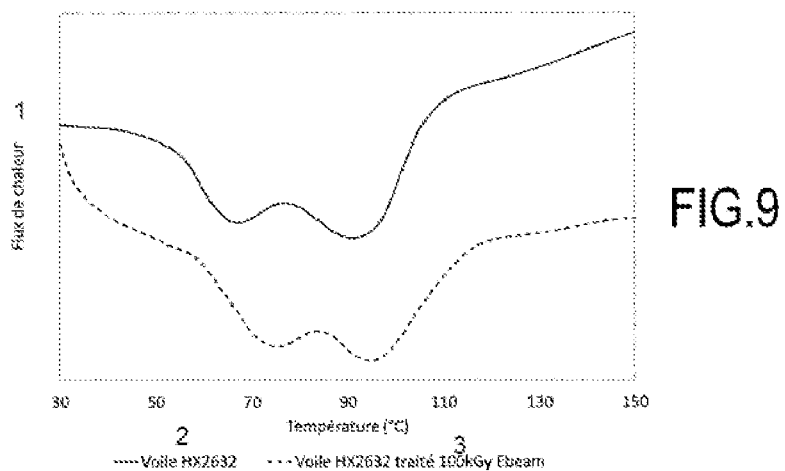
[Key to Figure 9: 1. Heat flow; 2. HX2632 web; 3. HX2632 web treated with 100kGy Ebeam]
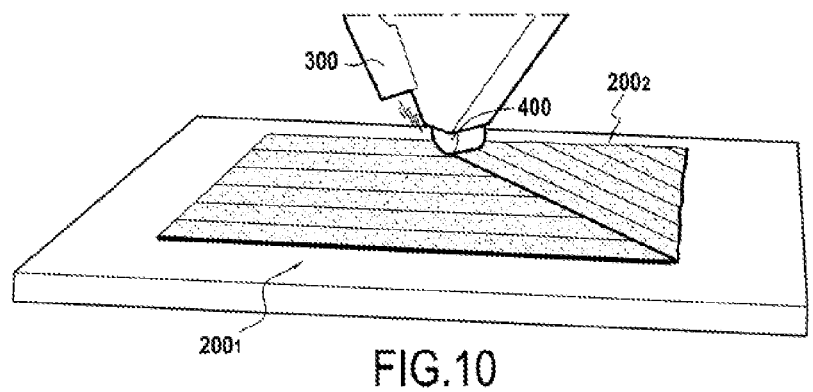
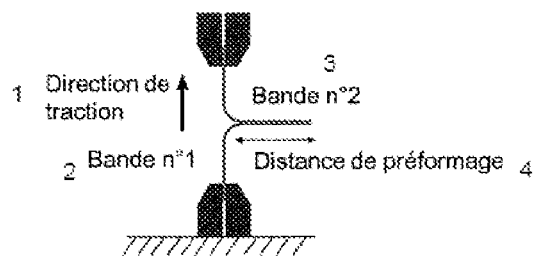
[Key to Figure 11: 1. Traction direction; 2. Strip no. 1; 3. Strip no. 2; 4. Preforming distance]

[Key to Figure 13: 1. Diameter]

[Key to Figure 14: 1. Aging cycles; 2. Time; 3. Temperature; 4. Humidity; 5. Dry air injection: 30 min; 6. Return to ambient temperature]

[Key to Figure 16: 1. Density of microcracks (cm$^{-1}$); 2. Number of cycles; 3. Comparative material 5; 4. Material 3 according to the invention; 5. Material 4 according to the invention]

[Key to Figure 19: 1. Non-cross-linked HX2632 web; 2. Hylink powder cross-linked in temperature; 3. HX2632 web treated with 100 kGy Beta]

REINFORCEMENT MATERIAL COMPRISING A POROUS LAYER MADE OF PARTIALLY CROSS-LINKED THERMOPLASTIC POLYMER AND ASSOCIATED METHODS

The present invention relates to the technical field of reinforcement materials for constituting composite parts. More specifically, the object of the invention is reinforcements for creating composite parts in association with an injected or infused resin, including a porous layer made of a partially cross-linked thermoplastic polymer, along with associated methods and uses.

Making composite parts or items—that is, those including one or more fiber reinforcements, specifically unidirectional fiber laps and a matrix (which is, more often than not, of the thermoset type and may include one or more thermoplastics)—may, e.g., be made using a so-called "direct" or "LCM" (Liquid Composite Molding) method. A direct method is defined by the fact that one or more fiber reinforcements are implemented while "dry" (that, is without the final matrix), with the resin or matrix being implemented separately, e.g., by injection into the mold containing the fiber reinforcements (the "RTM" or "Resin Transfer Molding" method), by infusion through the thickness of the fiber reinforcements (the "LRI" or "Liquid Resin Infusion" method, or the "RFI" or "Resin Film Infusion" method), or by coating/manual impregnation using rollers or brushes, on each of the fiber reinforcement unit layers, applied successively onto the form.

For the RTM, LRI, or RFI methods, one must generally first manufacture a fiber preform or stack in the shape of the desired finished item, then impregnate this preform or stack with a resin that is to constitute the matrix. The resin is injected or infused via temperature pressure differential, then once the entire quantity of resin required is contained inside the preform, the assembly is brought up to a higher temperature in order to carry out the polymerization/curing cycle and thereby cause it to harden.

Composite parts used in the motor, aeronautics, or naval industry are subject to very strict requirements, specifically in terms of mechanical properties. In order to save fuel and facilitate parts maintenance, the aeronautics industry has replaced numerous metal materials with lighter composite materials.

The resin that is subsequently associated, specifically by injection or infusion, with the fiber reinforcements when the part is made may be a thermoset resin, e.g., an epoxy-type resin. To enable it to flow properly through a preform composed of a stack of various fiber reinforcement layers, this resin is most often very fluid, e.g., having a viscosity on the order of 50 to 200 mPa·s., or lower, at the infusion/injection temperature. The primary disadvantage of this type of resin is its fragility following polymerization/curing, which leads to the created composite parts having poor impact resistance.

In order to solve this problem, the prior art has proposed associating the fiber reinforcement layers with thermoplastic polymer porous layers, specifically with a nonwoven (also referred to as a web) of thermoplastic fibers. Solutions of this type are disclosed in patent applications or U.S. Pat. Nos. 1,125,728, 6,828,016, WO 00/58083, WO 2007/015706, WO 2006/121961, U.S. Pat. No. 6,503,856, US 2008/7435693, WO 2010/046609, WO 2010/061114 and U.S. Pat. No. 2,547,816, US 2008/0289743, US 2007/8361262, US 2011/9371604, and WO 2011/048340. The addition of this thermoplastic layer, in particular of the nonwoven type, improves the mechanical properties of the produced composite parts on the compression after impact (CAI) test, which is widely used in order to characterize the impact resistance of structures.

Nevertheless, these solutions involve certain disadvantages. First, the thermoplastic polymer porous layers used often have a high melting point, specifically above 150° C., which makes the method for manufacturing these reinforcement materials expensive.

Moreover, the polymer thermoplastic material that makes up the porous layer may interact with the thermoset resin that will subsequently be injected or infused. This is increasingly likely as the melting point of the thermoplastic material decreases. The consequences are that it may modify the local stoichiometry of the thermoset resin and it may spread into the fiber reinforcements when the latter are impregnated with the thermoset resin, which should be avoided.

To solve this problem, the applicant has proposed in the prior art to use an epoxy powder such as the one used for the fabric developed under the reference Hexcel Primetex 43098 S 1020 S E01 1F, instead of a thermoplastic polymer porous layer. A thermoset layer of this type, obtained by depositing an epoxy powder having a softening temperature of around 100° C., makes it possible to produce composite parts more quickly and less expensively, and in particular at a lower temperature, since low-temperature preforming can be performed. Nevertheless, this type of technique involves practical problems due to the use of powder and does not yield satisfactory mechanical resistance properties.

Therefore, the object of the present invention is to provide novel reinforcement materials for making composite parts in association with an injected or infused resin that retain the beneficial effects on mechanical performance that have been observed when reinforcement materials including a thermoplastic porous layer are used.

Additionally, it has been noted that parts from the prior art made with intermediary materials had, under hygrothermal cycles, microcracks that might alter the durability of the structures. Throughout its lifespan, an aeronautical structure undergoes thermal cycles and periods of humidification (parking in a hot desert, flight at high altitude in very cold conditions, return to humid conditions during static phases on the ground such as maintenance, drying in flight, etc.). Such a phenomenon may make the use of the reinforcement materials of the prior art unsuitable for this type of applications.

Hence, the present invention also has the goal of proposing reinforcement materials that limit the creation of microcracks in the composite parts made subsequently of such materials, when these materials undergo hygrothermal stress.

In this context, the present invention relates to a reinforcement material including at least one fiber reinforcement associated on at least one of its faces with a polymer porous layer, with the polymer porous layer(s) representing no more than 10% of the total weight of the reinforcement material, preferably from 0.5 to 10% of the total weight of the reinforcement material, and preferably from 2 to 6% of the total weight of the reinforcement material. In the framework of the invention, said at least one polymer layer includes, or is constituted of, a partially cross-linked thermoplastic polymer. Such reinforcements, in which the weight of the polymer portion represents no more than 10% of the total weight of the reinforcement material, are traditionally referred to as dry reinforcement materials, as opposed to preimpregnated materials, which comprise a larger portion of polymer and do not require the addition of an external resin while composite parts are being made and are therefore subject to an entirely different set of problems. In the framework of the invention, given the partially cross-linked character of the porous layer that is present within the reinforcement material, the latter will only be partially soluble, or even totally insoluble, in the thermoset, thermoplastic resin or the mixture of thermoset and thermoplastic resins that are to be hot-injected or hot-infused into the reinforcement material.

Specifically, it may be recognized that the thermoplastic portion of the partially cross-linked thermoplastic polymer making up the porous layer will enable the use of a lower temperature during manufacturing and implementation of the reinforcement material, and therefore will save money and time when the composite part is made, whereas the thermoset portion will block the complete dissolution of the porous layer in the thermoset, thermoplastic resin or the mixture of thermoset and thermoplastic resins that will subsequently be injected or infused. Given that the thermoplastic portion of the partially cross-linked thermoplastic polymer only constitutes part of the porous layer, even if this part melts, in particular within a range of 80 to 130° C., this will not make the porous layer totally soluble in the thermoset, thermoplastic resin or in the mixture of thermoset and thermoplastic resins that are injected or infused, since the cross-linked portion will not melt. The presence of this thermoplastic portion also offers the advantage of enabling the manufacture of the reinforcement material that associates porous layer(s) and fiber reinforcement(s) at a temperature that is compatible with automated manufacturing methods, specifically hot fiber placement and forming of flat preforms.

Another advantage is that the melting point of the porous layer, which corresponds to the melting point of its thermoplastic portion, can be lower than 150° C., thereby making it possible to perform all of the manufacturing method steps prior to the resin injection needed at the end for making the part (from preparation of the dry material, to placement, and preforming) at a temperature below 150° C., or even lower.

Therefore, the object of the present invention is to combine the beneficial effects of using a thermoplastic porous layer on impact resistance performance, while having the option of performing all of the manufacturing method steps prior to resin infusion or injection at temperatures lower than 150° C., even lower than 140° C., and in certain cases even falling within the range of 80 to 130° C.

Another object of the invention is methods for preparing reinforcement materials in accordance with the invention. Specifically, such a method will include the following successive steps:

a1) having a fiber reinforcement,
a2) having at least one polymer porous layer including or composed of a partially cross-linked thermoplastic polymer,
a3) associating the fiber reinforcement with the at least one polymer porous layer including or composed of a partially cross-linked thermoplastic polymer.

Such a method may also start from a precursor material including a fiber reinforcement that is associated on at least one of its faces with a polymer porous layer including or composed of a thermoplastic polymer carrying cross-linkable functions and that makes it possible, after cross-linking of at least a portion of the cross-linkable functions present on the thermoplastic polymer, to lead to a reinforcement material according to the invention. Such a precursor material is also an integral part of the invention.

Finally, the present invention relates to the use of a reinforcement material according to the invention for making a preform or a composite part, in association with a thermoset, thermoplastic resin or a mixture of thermoset and thermoplastic resins, as well as a method for manufacturing a preform or a composite part starting from at least one reinforcement material according to the invention, wherein a thermoset, thermoplastic resin or a mixture of thermoset and thermoplastic resins is injected or infused into said reinforcement material or into a stack of several reinforcement materials according to the invention, as well as the parts and preforms produced by such a method.

Definitions

By "porous layer," we mean a permeable layer through which a liquid can pass, such as a resin that is injected or infused through the material when a preform or composite part is being made. Specifically, the opening factor of such a layer, determined using the method described in patent application WO 2011/086266, falls within the range of 30 to 99%, preferably within the range of 40 to 70%. As an example of a porous layer, we may cite porous films, grids created by interweaving threads, layers obtained by powder deposition, wovens, and nonwovens. Nevertheless, in the framework of the invention, regardless of the embodiment described, we prefer to use a porous layer in the form of a nonwoven, also referred to as a web. The porous layer is called a polymer layer because it is composed of a polymer or of a mixture of polymers and contains a partially cross-linked thermoplastic polymer. In the present description, the polymer porous layer may more simply be named "porous layer" for reasons of simplicity. In particular, the porous layer may be constituted solely of a partially cross-linked thermoplastic polymer or of a mixture of a partially cross-linked polymer and a thermoplastic polymer. In the second case, the partially cross-linked thermoplastic polymer/thermoplastic polymer mixture will contain, preferably, at least 10% by weight of partially cross-linked thermoplastic polymer, even more preferably at least 70% by weight of partially cross-linked thermoplastic polymer, relative to the weight of the partially cross-linked thermoplastic polymer/thermoplastic polymer mixture. In the case of a partially cross-linked thermoplastic polymer/thermoplastic polymer mixture, it will be possible to use a high level of cross-linking in the partially cross-linked thermoplastic polymer, specifically from 50 to 90%, combined with the presence of the thermoplastic polymer, which, preferably, will have a melting point within the range of 80 to 130° C. Conversely, it will be possible to use a low level of cross-linking in the partially cross-linked thermoplastic polymer, from 30 to 70%, combined with the presence of the thermoplastic polymer, which may then have a higher melting point, specifically above 150° C., even above 180° C., e.g., within the range of 180 to 400° C. The melting point may be determined using ISO Standard 11357-3. As examples of thermoplastic polymers, we may cite polyamides, polyesters, polyamide-imides, polyethersulfones, polyimides, polyetherketones, methyl polymethacrylates, aromatic polyethers, etc. In the framework of the invention, the polymer material constituting the porous layer is most preferably a partially cross-linked thermoplastic polymer and not a mixture with a thermoplastic polymer.

The polymer used in the framework of the invention is said to be "partially cross-linked" because it has a thermoplastic portion corresponding to straight or branched chains and a cross-linked portion forming a three-dimensional network. The cross-linked portion is obtained by cross-linking of a thermoplastic polymer carrying cross-linkable functions. Said cross-linkable functions are distributed over the thermoplastic polymer prior to the cross-linking step. Specifically, the thermoplastic polymer carrying cross-linkable functions may take the form of a branched polymer carrying a cross-linkable function at the end of the branched chains.

All types of cross-linkable functions may be suitable: functions that are cross-linkable by heat, by UV, gamma, or beta radiation, or those requiring the presence of a peroxide-type catalyst, which will then be used in mixture with the partially cross-linkable thermoplastic polymer.

For practical reasons, the partially cross-linked thermoplastic polymers obtained by cross-linking of cross-linkable functions under the action of heat or radiation, and not requiring a chemical catalyst, are preferred. Preferably, using functions that are cross-linkable under the action of UV, gamma, or beta radiation, which enable greater control of cross-linking, will be selected. Cross-linking can be performed in an inert atmosphere or ambient air. By way of example of functions that are cross-linkable under the action of UV, gamma, or beta radiation, we may cite unsaturated functions.

Advantageously, the partially cross-linked thermoplastic polymer belongs to the family of copolyamides, and in particular the caprolactams and/or lauryllactams.

Partially cross-linkable thermoplastic polymers including such unsaturated functions that are cross-linkable under the action of UV, gamma, or beta radiation are described in patent application EP 1591468 and are sold by the ARKEMA company under the reference Platamid® HX2632.

As an example of a polymer that is suitable in the framework of the invention, we may cite the partially cross-linked thermoplastic polymers obtained by cross-linking of a branched copolyamide with unsaturated ends composed of:
  at least one unit originating from a multifunctional monomer (A) selected from diethylene triamine, pentaerythritol, mellitic acid, and 2,2-dimethylolpropionic acid,
  with at least chain formations resulting from condensation in the presence of at least one unsaturated monoacid used as a chain limiter, and
  either at least two alpha,omega-aminocarboxylic acids that do not have the same number of carbon atoms,
  or at least two lactams that do not have the same number of carbon atoms,
  or at least one lactam, at least one carboxylic diacid, and at least one diamine,
  or one lactam and/or one alpha,omega-aminocarboxylic acid that do not have the same order of carbon atoms,
  or one diamine and one carboxylic acid,
  or at least one diamine, at least one carboxylic diacid, and at least one alpha,omega-aminocarboxylic acid, the proportion of (A) being lower than 9% by weight of the assembly of (A) and of the other previously-cited monomers.

More particularly, the chain formations of the branched copolyamide with unsaturated ends include at least caprolactam and lauryllactam, or they include at least caprolactam, hexamethylene diamine, and adipic acid.

The unsaturated monoacid of the branched copolyamide with unsaturated ends is, more particularly, crotonic acid or undecylenic acid.

As examples of thermoplastic polymers that are cross-linked under the action of heat and that do not require a catalyst, we may cite those obtained by cross-linking copolyamides including isocyanate and epoxy functions.

Such polymers are described in the patents EP 1808468 and U.S. Pat. No. 9,205,630 and are, e.g., sold by the Evonik company under the reference Vestamelt Hylink (X1333).

The polymer composing the porous layer includes a thermoplastic portion and a cross-linked portion. The thermoplastic portion preferably represents from 30 to 90% by weight, more preferably from 3 to 70% by weight, of the weight of the polymer. Hence, a large portion of non-cross-linked porous layer remains, which is needed for making the preform.

The portion by weight that the thermoplastic portion of a partially cross-linked polymer represents can be determined by solubilizing the thermoplastic portion in a solvent in which it is soluble (e.g., by immersion for 3 days at ambient temperature (23° C.)), and measuring the difference in weight before and after solubilization (the residue obtained after solubilization is, e.g., filtered and dried at 50° C. for 4 hours), as presented in the examples.

Advantageously, the thermoplastic portion of the partially cross-linked polymer has a melting point within the range of 80 to 130° C., preferably within the range of 80 to 120° C. The melting point of the partially cross-linked polymer that corresponds to the melting point of its thermoplastic portion can be determined by DSC, "Differential Scanning Analysis," according to ISO Standard 11357-3. With such melting points, it is possible to make the material according to the invention, and perform the operations for depositing and creating a preform, for making a composite part, at temperatures lower than 130° C., which is especially advantageous for large-scale production.

The polymer composing the porous layer may be an amorphous polymer but will preferably be a semi-crystalline polymer. Since semi-crystalline polymers have a glass transition temperature that is lower than their melting point, they are easier to soften, which makes it easier to associate them with the fiber reinforcement by gluing or encourages the subsequent placement and/or preforming of the reinforcement material according to the invention. Moreover, semi-crystalline polymers have an organized molecular structure in which the chains are aligned, which gives them better mechanical properties than amorphous polymers, whose molecular structure is not organized.

By "fiber reinforcement associated with a porous layer on at least one of its faces," we mean that the fiber reinforcement is connected to at least one porous layer that is attached onto at least one of the reinforcement's faces. This type of connection will be made by gluing, given the fact that the porous layer has a hot-melt character due to its thermoplastic portion. It is also possible, specifically in the case of a stack including several fiber reinforcements and several porous layers, for this connection to be complemented or replaced by a mechanical connection such as stitching, knitting, or any other physical means (needling, etc.).

The reinforcement materials according to the invention may be referred to as "dry" because they are intended to be associated with a binder, in particular with a thermoset resin, for the manufacture of a composite part. Hence, the weight of partially cross-linked thermoplastic polymer making up the porous layer(s) of the reinforcement material according to the invention does not represent more than 10% of the total weight of the reinforcement material according to the invention, and preferably represents from 0.5 to 10%, and even more preferably from 2 to 6% of the total weight of the reinforcement material according to the invention.

A "nonwoven," also referred to as a "web," is traditionally understood to mean an assembly of randomly-placed short or continuous fibers. These nonwovens or webs may, e.g., be produced by the drylaid, wetlaid, spunlaid, spunbond, and meltblown methods, or by the electrospinning, flashspinning, or forcespinning methods, all of which are known in the art. Specifically, the fibers making up the nonwoven may have an average diameter ranging from 0.5 to 70 µm and preferably from 0.5 to 20 µm. The nonwovens may be composed of short fibers or, preferably, continuous fibers. In the case of a short-fiber nonwoven, the fibers have a length, e.g., ranging from 1 to 100 mm. The nonwovens offer a random and preferably isotropic covering.

Advantageously, the nonwoven(s) present in the reinforcement materials according to the invention has/have a mass per unit area ranging from 0.2 to 20 $g/m^2$. The thickness of a nonwoven in the reinforcement materials according to the invention may vary depending upon how it is associated with the fiber reinforcement. Preferably, the nonwoven or each of the nonwovens present in the reinforcement materials according to the invention has a thickness of 0.5 to 50 microns after it is associated with the fiber reinforcement, preferably 3 to 35 microns, when the association is made by applying heat and pressure in order to use the hot-melt character of the nonwoven. When the association is performed by mechanical means such as stitching, knitting, or needling, the thickness of the nonwoven can be greater than 50 microns, specifically within the range of 50 to 200 microns. The characteristics of these nonwovens can be determined using the methods described in patent application WO 2010/046609.

By "fiber reinforcement," we mean a layer of reinforcement fibers that may be in the form of a unidirectional fabric or lap of reinforcement fibers. The reinforcement fibers are glass, carbon, aramid, or ceramic fibers, with carbon fibers being particularly preferred.

Traditionally, in this field, "unidirectional lap or layer of reinforcement fibers" is understood to mean a lap composed exclusively or quasi-exclusively of reinforcement fibers laid down along a single direction, such that they lie substantially parallel to each other. In particular, according to a specific embodiment of the invention, the unidirectional lap does not have any weft threads that interweave with the reinforcement fibers, nor does it have any stitching that would lend cohesion to the unidirectional lap prior to its association with another layer, and in particular with a polymer porous layer. This prevents any crimping within the unidirectional lap. A unidirectional lap of reinforcement fibers can be composed of a single thread, although it is most often composed of several aligned threads placed side by side. The threads are placed in such a way as to ensure total or near-total coverage over the entire surface of the lap. In this case, in each of the laps making up the intermediary material, the threads are preferably placed edge to edge while minimizing or even avoiding altogether any gaps or overlaps.

In the unidirectional lap, the reinforcement thread(s) are preferably not associated with a polymer binder and are therefore considered dry; that is, they are not impregnated, covered, or associated with any type of polymer binder prior to their association with the polymer porous layers. Nevertheless, the reinforcement fibers are most often characterized by a standard sizing concentration by weight that may represent up to 2% of their weight. This is especially suitable for making composite parts by resin diffusion using direct methods known in the art.

The fibers that make up the fiber reinforcements used in the framework of the invention are preferably continuous. In general, the fiber reinforcements are made up of several threads.

Specifically, a carbon thread is composed of a set of filaments and generally has from 1000 to 80000 filaments, advantageously from 12000 to 24000 filaments. Particularly preferred in the framework of the invention, carbon threads from 1 to 24K, e.g., from 3K, 6K, 12K, or 24K, and more preferably from 12 to 24K, are used. For example, the carbon fibers that are present within the fiber reinforcements used in the framework of the invention have a count of 60 to 3800 Tex, and preferably of 400 to 900 Tex. A fiber reinforcement can be made with any type of carbon thread, e.g., High Resistance (HR) threads whose tensile modulus ranges from 220 to 241 GPa and whose tensile breaking stress ranges from 3450 to 4830 MPa, Intermediate Modulus (IM) threads whose tensile modulus ranges from 290 to 297 GPa and whose tensile breaking stress ranges from 3450 to 6200 MPa, and High Modulus (HM) threads whose tensile modulus ranges from 3450 to 5520 Pa (according to the "ASM Handbook," ISBN 0-87170-703-9, ASM International 2001).

Reinforcement Material According to the Invention

The invention can be customized for various types of reinforcement materials: simple reinforcement materials comprising a single fiber reinforcement intended to be stacked one atop the other, or more complex reinforcement materials comprising several fiber reinforcements in the form of a stack, which can be used alone or can also in the form of a stack.

As an example of simple reinforcement materials, we may cite the ones made up of a unidirectional lap of reinforcement fibers corresponding to the fiber reinforcement, associated on at least one of its faces with a porous layer as provided in the framework of the invention. In order to have a symmetrical material, the fiber reinforcement, and in particular the unidirectional lap of reinforcement fibers, is associated on each of its faces with a porous layer as provided in the framework of the invention and the porous layers that are present on each of the faces of the unidirectional lap of reinforcement fibers are preferably identical. In the framework of the invention, the porous layer has a hot-melt character and the association of the fiber reinforcement with the porous layer will be advantageously carried out thanks to the hot-melt character of the porous layer. This hot-melt character results from the thermoplastic portion of the partially cross-linked polymer that composes the porous layer.

As an example of more complex reinforcement materials, we may cite those composed of a stack of laps of unidirectional reinforcement fibers that are oriented in different directions, with at least one porous layer as provided in the framework that is placed between two unidirectional reinforcement fiber laps and/or placed on the surface of the stack. According to a first variation, such a material may be composed of a stack corresponding to a chain formation $(CM/R)^n$, with CM designating a polymer porous layer including or composed of a partially cross-linked thermoplastic polymer as provided in the framework of the invention, R being a fiber reinforcement as described in the framework of the invention, and n designating an integer, preferably with all of the CM layers that have an identical grammage, or that are even identical.

According to a second variation, such a material may be composed of a stack corresponding to a chain formation $(CM/R)^n/CM$, with CM designating a polymer porous layer including or composed of a partially cross-linked thermoplastic polymer as provided in the framework of the invention, R being a fiber reinforcement as described in the framework of the invention, and n designating an integer, preferably with the polymer outer porous layers including or being composed of a partially cross-linked thermoplastic polymer having a grammage equal to half of the grammage of each of the polymer inner porous layers including or being composed of a partially cross-linked thermoplastic polymer.

Specifically, in stacks of this type, the fiber reinforcements R are unidirectional laps of reinforcement fibers, and more particularly of carbon fibers, preferably of identical grammage.

Such materials are referred to as NCFs (non-crimp fabrics). In the NCF field, it is traditional for the association of unidirectional laps of reinforcement fibers among themselves and with the porous layer(s) that is/are present is carried out by stitching or knitting. Of course, this association by stitching or knitting may be replaced by or complemented by an adhesion carried out by the hot-melt character of the porous layer, or by any other type of physical connection (needling, etc.).

In the case of NCFs, the reinforcement material according to the invention is composed of unidirectional laps lying in various orientations selected from the angles 0°, 30°, 45°, 60°, 90°, 120°, 135°. All of the laps can have different orientations or only some of them may. By way of example, the reinforcement material according to the invention could be made according to the following stacks: 0°/90°, 90°/0°, 45°/135°, 135°/45°, 90°/0°/90°, 0°/90°/0°, 135°/45°/135°, 45°/135°/45°, 0°/45°/90°, 90°/45°/0°, 45°/0°/90°, 90°/0°/45°, 0°/135°/90°, 90°/135°/0°, 135°/0°/90°, 90°/0°/135°, 45°/0°/135°, 135°/0°/45°, 45°/135°/0°, 0°/135°/45°, 45°/135°/90°, 90°/135°/45°, 135°/45°/0°, 0°/45°/135°, 135°/45°/90°, 90°/45°/135°, 60°/0°/120°, 120°/0°/60°, 30°/0°/150°, 150°/0°/30°, 135°/0°/45°/90°, 90°/45°/0°/135°, 45°/135°/0°/90°, 90°/0°/135°/45°, 0°/45°/135°/90°, 90°/135°/45°/90°, 90°/135°/0°/45°, 45°/0°/135°/90°, with 0° corresponding to the feed direction of the machine for making the reinforcement material according to the invention. For an association by stitching or knitting, the general direction of the stitching or knitting threads will also generally correspond to 0°. Making such multiaxials is known and implements traditional techniques such as those described in "Textile Structural Composites, Composite Materials Series Volume 3" by Tsu Wei Chou & Franck.K.Ko, ISBN 0-444-42992-1, Elsevier Science Publishers B.V., 1989, Chapter 5, Paragraph 3.3, or in patent FR2761380, which describes a method and device for making multiaxial fiber laps. The unidirectional laps can be constituted prior to, or placed on line, when the multiaxial is made. The connection via stitching or knitting of the various unidirectional laps can be carried out along sewing or knitting stitches, lying on lines parallel to each other. The sewing or knitting stitches are spaced, in a single line along a spacing, preferably identical, of 1 to 20 mm, preferably 2 to 12 mm. Likewise, two consecutive lines of stitching or knitting are, e.g., spaced 2 to 50 mm apart from each other, preferably 5 to 15 mm. Preferably, all of the consecutive lines of stitching of a series of lines that are parallel to each other will be spaced an identical distance apart. As an example of a material constituting the stitching thread that is especially suitable in the framework of the invention, we may cite polyesters (PET), polypropylenes (PP), polyethylenes (PE), phenylene polysulfides (PPS), polyethylene naphthalates (PEN), liquid crystal polymers (LCP), polyketones, polyamides, cross-linkable thermoplastics, carbon, glass, basalt, silica, and mixtures thereof. Polyethylene terephthalate, polybutylene terephthalate, polytrimethylene terephthalate, polylactic acid, and copolymers thereof are examples of polyesters that can be used. The thread will have, e.g., a thread count ranging from 5 to 150 dTex, specifically below 30 dTex, e.g., determined according to EN ISO Standard 2060. For more information on the constructions that can be used in NCF-type materials, please see the documents EP 2547816 or WO 2010/067003.

Precursor Reinforcement Material According to the Invention

The invention also relates to a precursor material comprising a fiber reinforcement that is associated on at least one of its faces with a polymer porous layer comprising or constituted of a thermoplastic polymer carrying cross-linkable functions and that leads, after cross-linking of at least a portion of the cross-linkable functions present on the thermoplastic polymer, to a reinforcement material according to the invention. This precursor material differs from the material of the invention solely by the fact that the polymer is not yet partially cross-linked. For the remainder, the other features are, in every respect, identical to those of the previously-described reinforcement material of the invention. FIG. 1 illustrates the transformation of such a precursor reinforcement material comprising a fiber reinforcement associated on only one of its faces with a cross-linkable thermoplastic porous layer, into a reinforcement material according to the invention, following the partial cross-linking of the porous layer.

Method for Preparing a Reinforcement Material According to the Invention

In the framework of the invention, the cross-linking of the porous layer(s) can be performed before or after the latter is/are placed on a fiber reinforcement, or associated with said fiber reinforcement.

According to a first variation, a reinforcement material according to the invention can be prepared by implementing the following successive steps:

a1) having a fiber reinforcement, a2) having at least one polymer porous layer comprising or constituted of a partially cross-linked thermoplastic polymer, a3) associating the fiber reinforcement with the at least one polymer porous layer comprising or constituted of a partially cross-linked thermoplastic polymer.

Step a3) can be obtained by applying the at least one porous layer onto the fiber reinforcement, said application being accompanied or followed by heating the partially cross-linked thermoplastic polymer, resulting in its softening or melting, followed by cooling.

According to a second variation, a reinforcement material according to the invention can be prepared by implementing the following successive steps:

b1) having a precursor material according to the invention, comprising a fiber reinforcement associated on at least one of its faces with a polymer porous layer comprising or constituted by a thermoplastic polymer carrying cross-linkable functions, b2) cross-linking at least part of the cross-linkable functions present on the thermoplastic polymer.

In this case, the method can include the following successive steps, upstream of Step b1):

c1) having a fiber reinforcement, c2) having at least one polymer porous layer comprising or constituted by a thermoplastic polymer carrying cross-linkable functions, c3) associating the fiber reinforcement with the at least one polymer porous layer comprising or constituted by a thermoplastic polymer carrying cross-linkable functions.

Step c3) is obtained by applying the at least one porous layer onto the fiber reinforcement, said application being accompanied or followed by heating of the thermoplastic polymer carrying cross-linkable functions, leading to its softening or melting, but not leading to cross-linking of the cross-linkable functions, followed by cooling.

Preferably, regardless of the variation selected, the cross-linkable functions can be cross-linked by irradiation, specifically by the action of UV, gamma, or beta radiation, or by heating.

Cross-linking can also be performed by adding a peroxide-type catalyst that is present within the porous layer. The catalyst can be introduced by depositing, in particular by spraying it, onto the porous layer.

The cross-linking mode will, of course, be selected based on the polymer used and the cross-linkable functions that are present.

Cross-linking can be performed under an inert atmosphere or in ambient air. More often than not, for UV, gamma, or beta cross-linking, cross-linking is performed at a temperature ranging from 20 to 50° C.

The cross-linking conditions will be adapted by a person skilled in the art based on the cross-linkable thermoplastic polymer used, and based on the cross-linkable functions present on said polymer. Specifically, in the case of gamma or beta radiation, doses ranging from 25 to 300 kGy and preferably from 50 to 200 kGy (kiloGrays) will be adopted, with, preferably, application of an acceleration voltage of 60 to 300 kV (kiloelectronVolts) for beta radiation.

By adjusting the level of cross-linking, in particular the cross-linking obtained by modulating the parameters of the radiation used, it is possible to control the degree of insolubility of the obtained partially cross-linked porous layer.

As discussed previously, cross-linking can also be carried out on a polymer layer comprising or constituted by a thermoplastic polymer carrying cross-linkable functions, [both] before its association with a fiber reinforcement and after this association. Nevertheless, depending upon the cross-linking technique used, and especially in the case of cross-linking by irradiation, which is easier to control, the selected technique may depend upon the number of porous layers and their accessibility.

When the cross-linking step is carried out on a precursor material of a reinforcement material according to the invention, said precursor material comprising a fiber reinforcement associated on at least one of its faces with a polymer porous layer comprising or constituted by a thermoplastic polymer carrying cross-linkable functions, cross-linking can be performed as the final step of an automated method, by having the obtained product pass under beta radiation (also called an "e-beam"). When cross-linking is activated under gamma radiation, it is even possible to perform the irradiation on rollers or palettes of precursor material.

Hence, for simple material comprising a single fiber reinforcement, the first or second variation could be used, although the second variation is preferred. Based on the cross-linking technique used (irradiation under beta beam), it may be necessary to perform irradiation on both faces of the material, with the reinforcement fibers acting as a radiation-blocking screen.

In the case of more complex materials comprising at least one porous layer between two fiber reinforcements, and specifically in the case of NCFs, the first variation will preferably be used, particularly when cross-linking is performed under irradiation with a beta beam.

Of course, regardless of the preparation method used, the porous layer and the reinforcement material will be selected such that, in the end, the polymer porous layer(s) represent no more than 10% of the total weight of the reinforcement material, preferably from 0.5 to 10% of the total weight of the reinforcement material, and still more preferably from 2 to 6% of the total weight of the obtained reinforcement material.

Use and Method Using a Reinforcement Material According to the Invention for the Manufacture of a Preform or a Composite Part The reinforcement materials of the invention comprising a fiber reinforcement associated on at least one of its faces with a polymer porous layer comprising or constituted by a thermoplastic polymer carrying cross-linkable functions are perfectly suited for making a preform or a composite part in association with a thermoset, thermoplastic resin or a mixture of thermoset and thermoplastic resins.

Traditionally, in a method for manufacturing a preform or a composite part from at least one reinforcement material according to the invention, a thermoset, thermoplastic resin or a mixture of thermoset and thermoplastic resins is injected or infused into said reinforcement material or into a stack of several reinforcement materials.

In the framework of the invention, given the presence of a thermoplastic portion in the porous layer that is present in the reinforcement material, prior to the infusion or injection of the resin, placement or lay-up using the hot-melt character of said at least one porous layer present in the reinforcement material may be implemented. Advantageously, the methods for manufacturing a preform or a composite part include a step for placing or lay-up a material according to the invention wherein the porous layer is heated to a temperature leading to the at least partial melting of the porous layer(s) defined in the framework of the invention, and in particular to a temperature ranging from 80 to 130° C., preferably from 80 to 120° C.

The steps used for manufacturing the composite part are traditional and well known in the art. It is possible to make a flat preform, even a preform in a desired three-dimensional shape. Specifically, the placement of a reinforcement material according to the invention can be performed continuously with application of pressure perpendicular to the placement surface in order to press it onto this surface. Such methods, known as AFP (Automated Fiber Placement) or ATL (Automated Tape Layup), are, e.g., described in documents WO 2014/076433 A1 or WO 2014/191667. Various strips of material according to the invention can be placed one next to the other along placement paths that may or may not be parallel, depending upon the preform to be made, so as to form a series of plies placed one atop the other. As placement is proceeding, the thermoplastic material of the porous layer is activated—that is, softened—so as to use the hot-melt character of the material. When a ply is fully placed, the orientation is modified in order to place the following ply along a placement path that is different from the previous ply. Each strip is placed parallel or not parallel (depending upon the geometry of the part to be made) to the previous strip, with or without an inter-strip space and with melting over the entire surface. This placement method is suitable for reinforcement material widths ranging from 3 to 300 mm, with, preferably, a small width variation (<0.25 mm). If the reinforcement material is wider than that, it can be placed by any other suitable means.

As final steps, the manufacture of the composite part implements a step for diffusion, via infusion or injection, of a thermoset, thermoplastic resin or of a mixture of thermoset and thermoplastic resins within the reinforcement material or a stack of reinforcement materials according to the invention, followed by a step for consolidating the desired part via a polymerization/cross-linking step following a defined temperature cycle and under pressure, and a cooling step. According to a specific embodiment, which incidentally is suitable for all of the implementation variations described in relation to the invention, the diffusion, consolidation, and cooling steps are implemented in an open or closed mold.

A resin diffused within the reinforcement material or a stack of reinforcement materials according to the invention may be thermoplastic or preferably thermoset, or may be constituted of a mixture of thermoset and thermoplastic resins. As examples of thermoplastic resins, we may cite polyamides, polyesters, polyamide-imides, polyethersulfones, polyimides, polyetherketones, methyl polymethacrylates, aromatic polyethers, etc. Usable thermoset resins are, in particular, selected from epoxides, unsaturated, polyesters, vinylesters, phenolic resins, polyimides, bismaleimides, phenolformaldehyde resins, urea-formaldehydes, 1,3, 5-triazine-2,4,6-triamines, benzoxazines, cyanate esters, and mixtures thereof. Such a resin may also include one or more hardening agents known in the art to be used with the selected thermoset polymers. In particular, the invention will be implemented with a thermoset resin, specifically an epoxy resin.

Preferably, the invention will use an infusion under reduced pressure, specifically under a pressure below atmospheric pressure, more specifically below 1 bar and more preferably ranging from 0.1 to 1 bar, of the thermoset resin for the creation of the composite part. Preferably, the infusion will take place in an open mold, e.g., by infusion in a vacuum bag.

The final composite part is obtained following a heat treatment step. Specifically, the composite part is generally obtained by a traditional consolidation cycle of the polymers under consideration by performing a heat treatment, which is recommended by the suppliers of these polymers, and is known in the art. The step for consolidation of the desired part is performed by polymerization/cross-linking following a defined temperature cycle and under pressure, followed by cooling. For thermoset resin, there is often a step for gelling the resin before it is hardened. The pressure applied during the treatment cycle is low for infusion under reduced pressure and higher for injection into an RTM mold.

The following examples, with reference to the attached Figures, illustrate but in no way limit the invention.

FIG. 1 shows, very schematically, the partial cross-linking of the porous layer of a precursor reinforcement material presented in cross-section and including a fiber reinforcement associated on only one of its faces with a cross-linkable thermoplastic porous layer, leading to a reinforcement material according to the invention, then including a fiber reinforcement associated with a partially cross-linked thermoplastic porous layer.

FIG. 9 shows the melting behavior curve of the HX2632 web following irradiation under 100 kGy of beta radiation by DSC, according to ISO Standard 11357-3.

FIG. 10 illustrates, in diagram form, a method for placing a reinforcement material.

FIG. 11 illustrates, in diagram form, the peel test used in the examples.

MATERIALS/PRODUCTS USED

Figure 1:
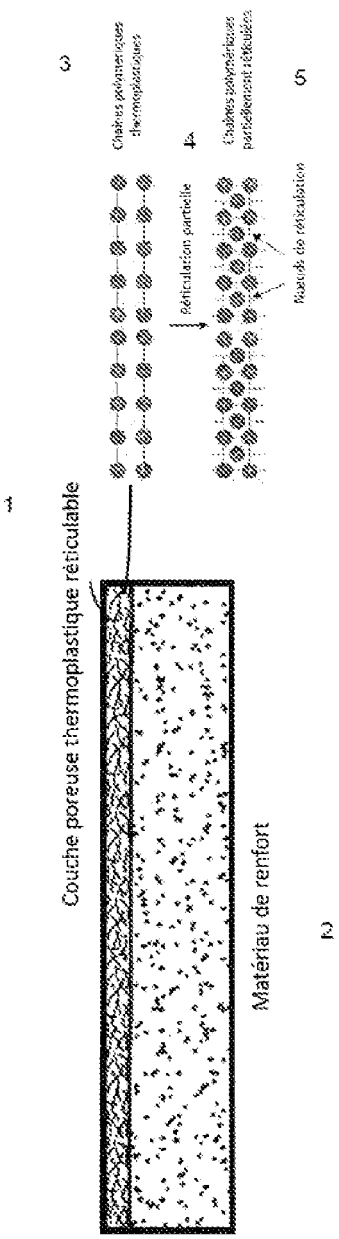

The porous layers according to the invention were made with:

1) Either a web of fibers made of Platamid® HX2632 polymer sold by the Arkema company (copolyamide with terminal unsaturations enabling a three-dimensional network under UV, gamma, or beta treatment), which has a melting point of 117° C.—this web (referred to hereinafter as web HX2632) is obtained by melt blowing and has a mass per unit area of 100 µm prior to lamination onto the fiber reinforcement. The diameter of the fibers that compose it is 15 µm. The opening factor of such a layer, determined according to the method described in patent application WO 2011/086266, is 50+/−10%.

2) Or by depositing a thermoplastic copolyamide powder that is cross-linkable in temperature due to the presence of epoxy and isocyanate functions, enabling the creation of a T-shaped three-dimensional network, [missing text: presumably "such as the product"] Vestamelt Hylink (X1333) sold by Evonik, which has a melting point of 123° C. The cross-linking can be initiated at a temperature of 150° C.

The porous layers used for comparison purposes were made with:

1) Either a 1R8D04 thermoplastic web sold by the Protechnic company (66, rue des Fabriques, 68702—CERNAY Cedex—France), which has a melting point of 160° C.—this web (hereinafter referred to as web 1R8D04) is obtained by melt blowing and has a mass per unit area of 4 g/m$^2$ and a thickness of 100 µm prior to lamination onto the fiber reinforcement. The diameter of the fibers that compose it is 15 μm. The opening factor of such a layer, determined according to the method described in patent application WO 2011/086266, is 50+/−10%.

2) or a web of fibers made of a thermoplastic polymer, PA11 LMNO, sold by the Arkema company, which has a melting point of 188° C.—this web (referred to hereinafter as web PA11 LMNO) is obtained by melt blowing and has a mass per unit area of 4 g/m$^2$ and a thickness of 100 μm prior to lamination onto the fiber reinforcement. The diameter of the fibers that compose it is 15 μm. The opening factor of such a layer, determined according to the method described in patent application WO 2011/086266, is 50+/−10%.

3) or by depositing a layer of epoxy powder used in the fabric Hexcel Primetex 43098 S 1020 S E01 1F. The average diameter of the powder is 51 μm (D50, median value), and its glass transition temperature ranges from 54 to 65° C.

The fiber reinforcements used in all cases are carbon fiber unidirectionals sold by the applicant under the reference IMA 12K. The properties of these 12K fibers are summarized in Table 1 below.

The thermoset resins that can be used for making composite parts are the RTM6 and RTM230ST epoxy resins sold by the company Hexcel Composites, Dagneux France.

TABLE 1

|  | Hexcel IMA 12K |
| --- | --- |
| Tensile strength (Mpa) | 6.067 |
| Tensile modulus (GPa) | 297 |
| Final elongation at break (%) | 1.8 |
| Density (g/cm$^3$) | 1.79 |
| Weight/length (g/m) | 0.445 |
| Diameter of filaments (μm) | 5.1 |

Hot microscopy analysis: The analyses were performed on an Imager Axio M2m Microscope by Zeiss, Marly-le-Roi, France, equipped with a heating device by Linkam Scientific Instruments, Tadworth, UK.

Rheology: Viscosity analyses were performed on a HAAKE Mars rheometer by Thermofisher Scientific, Courtaboeuf, France.

Lamination of Webs—Production of a "Webbed UD" Reinforcement Material

Figure 2:
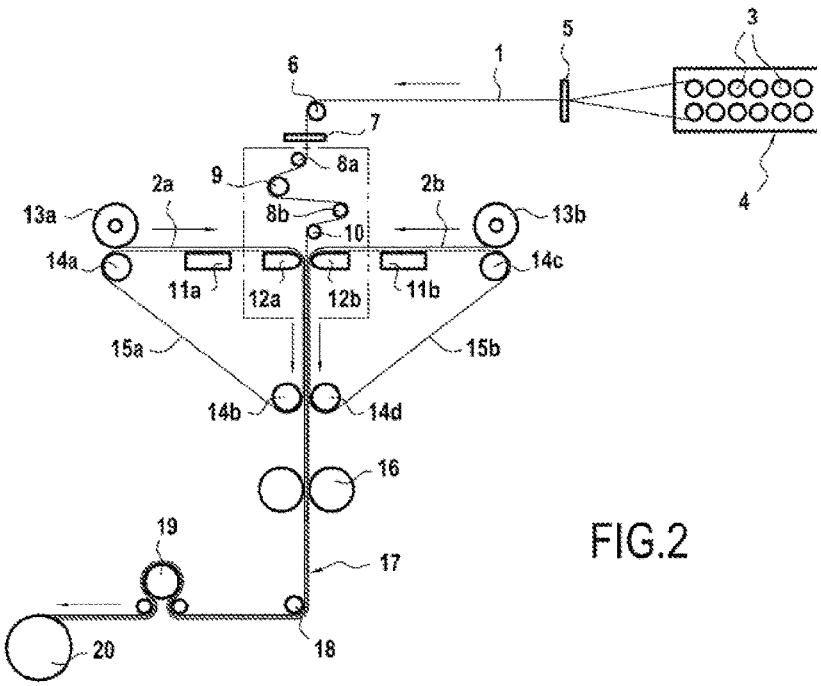
FIG. 2 shows, in diagram form, the method used in the examples for the manufacture of reinforcement materials, referred to as "webbed UDs."

The web is laminated directly on each side of the carbon fiber unidirectional laps by means of a machine (FIG. 2) specifically used for this purpose, immediately after the lap at the desired grammage has been formed. The carbon threads 1 are unrolled from carbon spools 3 attached to a creel 4, passing through a comb 5, are led into the shaft of the machine by means of a guide roller 6 and a comb 7, of a guide bar 8a. The carbon threads are preheated using a heating bar 9 and then are spread by the spreader bar 8b and the heating bar 10 to the desired carbon mass per unit area of the unidirectional lap 17. The web rolls 13a and 13b are unrolled without tension and transported using conveyor belts 15a and 15b attached between the freely rotatable rollers 14a, 14b, 14c, 14d and the heated bars 12a, 12b. The webs 2a and 2b are preheated in the zones 11a and 11b before being in contact with the carbon threads 1 and laminated on either side of two heated bars 12a and 12b, whose air gap is controlled. A calender 16, which may be cooled, then applies pressure onto the unidirectional lap with a web on each side 17. A return roller 18 redirects the product 17 toward the traction system including three rollers for drawing it 19 then rolling it 20, driven by an engine to form a roll composed of the formed material 17.

The test conditions for manufacturing carbon unidirectional laps combined with a web on each side (referred to as "webbed UD") are listed in Table 2 below.

TABLE 2

Method parameters for implementing unidirectional laps associated with a web on each side

| Web | Measured mass per unit area of the unidirectional (g/m$^2$) | Line speed (m/min) | Bar temp. (° C.) (9) | Bar temp. (° C.) (10) | Web preheating temp. (° C.) (11a &11b) | Bar temp. (° C.) (12a & 12b) |
| --- | --- | --- | --- | --- | --- | --- |
| Web HX2632 | 210 | 2.4 | 60 | 65 | 85 | 100 |
| Web 1R8D04 | 210 | 2.4 | 200 | 200 | 160 | 180 |
| Web PA11 LMNO | 210 | 2.4 | 200 | 200 | 160 | 180 |

Measurements Performed

DSC: Differential Scanning Analysis. The analyses were performed on a Q2000 apparatus by TA Instruments, Guyancourt, France.

DMA: Dynamic Mechanical Analysis. The analyses were performed on a Q800 apparatus by TA Instruments, Guyancourt, France.

A. Tests Performed when Webs Used

I. Influence of the Applied Radiation on the Produced Cross-Linked Portion

Web HX2632 is treated with various beta radiations (equipment by COMET, Flamatt, Switzerland, acceleration voltage of 150 kiloelectronVolt (kV) and irradiation doses from 50 to 100 kiloGrays (kGy).

Figure 3:
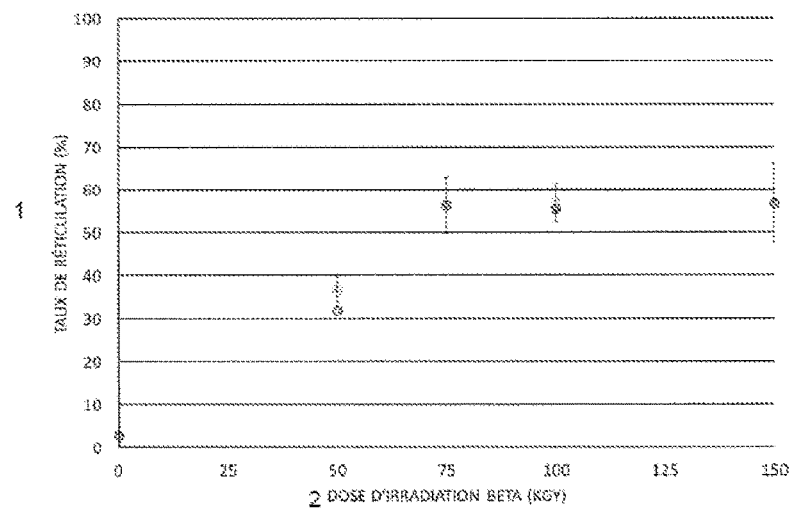
FIG. 3 shows the level of cross-linking obtained for an HX2632 web and a webbed UD material made with such a web, based on the applied dose of beta irradiation.

The irradiation is performed before the web is associated with the unidirectional. Since thermoplastic copolyamides are soluble in formic acid, the cross-linked portion is determined as follows: the webs or webbed UD obtained following these irradiations are immersed in formic acid for 3 days at ambient temperature (23° C.), then the obtained residue is filtered and dried at 50° C. for 4 hrs. FIG. 3 shows the change in the percentage by weight represented by this residue (therefore corresponding to the cross-linked portion), relative to the total weight of the web obtained after cross-linking. The obtained results are the same regardless of whether the irradiation is performed on the web alone or on a web/unidirectional combination.

It appears that the cross-linked portion varies from 30 to 60% and varies based on the irradiation conditions used.

II. Influence of Cross-Linking on Solubility in the RTM6 Resin

Web HX2632, before irradiation, and RTM6 epoxy resin applied onto the web are placed between two glass slides, and the slides are placed under an optical microscope. The assembly then undergoes a temperature rise of 2° C./min up to a temperature of 180° C., corresponding to the final temperature upon infusion or injection of the resin when a composite part is being made. Therefore, this is the critical cycle for the web's temperature resistance since no step for precross-linking the resin is used.

Figure 4:
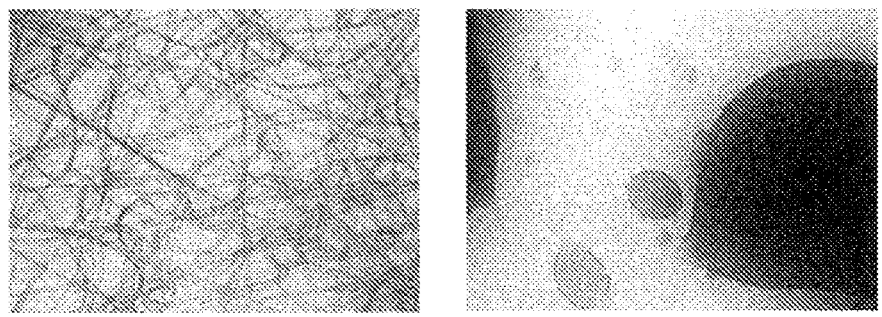
FIGS. 4 to 6 show images obtained under optical microscopy, when various webs and the resin are placed between two glass slides and undergo (or do not undergo) heating.

FIG. 4 shows the image obtained at 23° C. (left) and at 180° C., therefore after cross-linking of the resin (right). It appears that the web dissolves in the resin when it is not partially reticulated.

Figure 5:
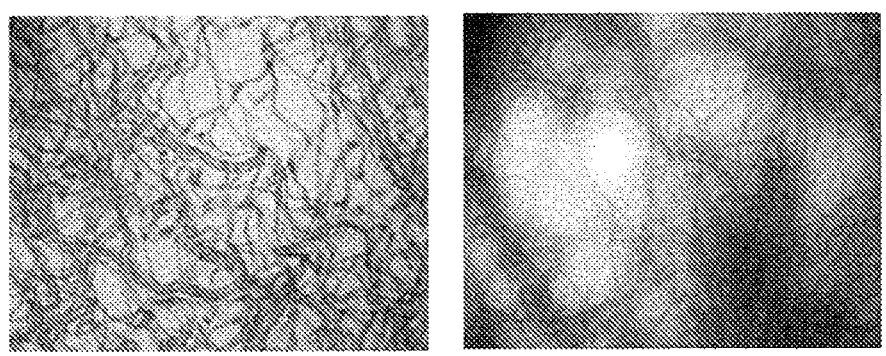

FIG. 5 shows the image obtained at 180° C. when the web used is the web HX2632 that has undergo irradiation of 100 kGy of beta rays, using two thermoset resins: RTM6 (left) and RTM230ST (right). It appears that the obtained cross-linking makes the web insoluble in these two resins.

Figure 6:
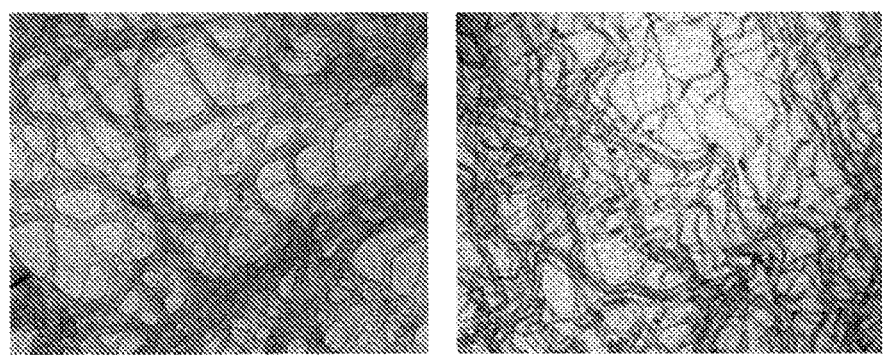

FIG. 6 shows the change in this insolubility based on the cross-linking level: treatment with 50 kGy of beta rays (35+/−5 by weight of cross-linked portion) (left), treatment with 100 kGy of beta rays (57+/−5 by weight of cross-linked portion) (right). The cross-linking levels are obtained by taking the arithmetic mean of six measurements and the standard deviation is defined as being quadratic mean of the deviations at the mean $$\left(\sqrt{\frac{1}{n}\sum_i (x_i - \bar{x})^2}\right).$$

The increase of the cross-linked portion therefore makes it possible to increase and control the insoluble portion of the web.

The photos presented show that the presence of the cross-linked portion of the porous layer makes it possible to retain the web's integrity in the liquid resin and appears to reduce the molecular mobility of the thermoplastic portion.

III. Influence of Cross-Linking Studied by DMA

Figure 7:
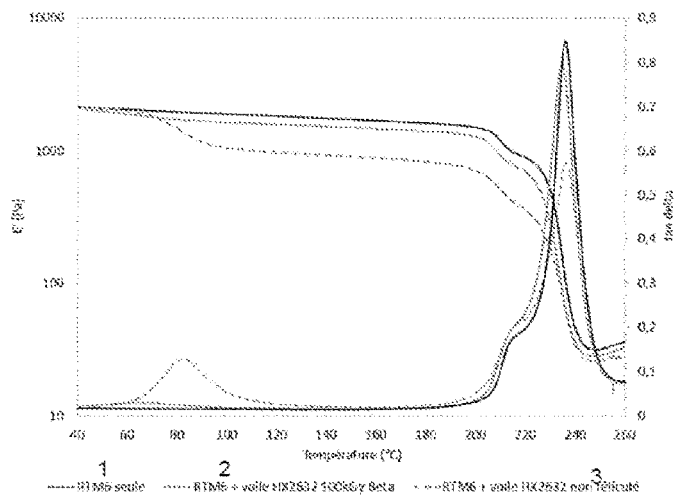
FIGS. 7 and 8 show the DMA curves obtained on various resin/web samples according to EN Standard 6032 (1 Hz, 1° C./min, Amplitude 15 µm).

These results can be correlated with the DMA curves (obtained according to NE Standard 6032) on the RTM6/web samples. These samples were prepared by impregnating the web which was kept vertical inside a metal mold. Once the impregnation with the RTM6 resin was complete, the samples were prepolymerized at 120° C. for 45 minutes, followed by a post-curing for 2 hours at 180° C. As can be seen in FIG. 7 (DMA Analysis, 1 Hz, 1° C./min-Amplitude 15 µm), the dose of irradiation applied to the web greatly influences the thermomechanical properties symbolized by the DMA results: by increasing the cross-linking level, it is possible to maintain the thermomechanical performance of the material until the glass transition of the epoxy-amine network of the RTM6 resin, and the thermoplastic contribution is negligible (Dose of 100 kGy in Beta electron beam). On the other hand, without cross-linking, the thermoplastic transition is clearly visible at about 80° C. and leads to a decrease in thermomechanical properties. This confirms the results obtained in optical microscopy and shows that by irradiating the web, it is possible to control the interactions between the web and the epoxy resin.

This is the point of the invention, since it appears that once it is treated with 100 kGy of Beta rays, the web HX2632 does not impact the thermomechanical properties of the thermoset resin, despite its low melting point.

Figure 8:
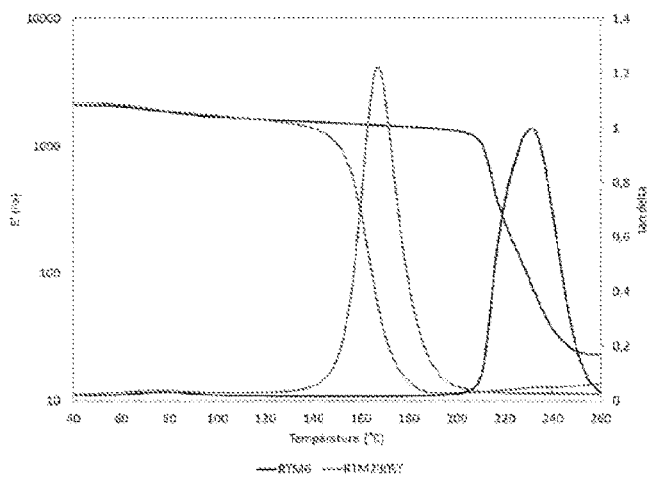

Additionally, FIG. 8, obtained with the web HX2632 having undergone irradiation by an electron beam (Beta rays) of 100 kGy, shows that these observations are confirmed regardless of the resin used: RTM6 or RTM230ST.

IV. Study Using DSC

The final step for fully understanding the behavior of the web following irradiation was to verify that it was still able to melt after irradiation. For the most cross-linked webs (cross-linked portion representing 57% by weight, obtained after irradiation under 100 kGy electron beam and 35% by weight, obtained after irradiation under 50 kGy electron beam), it was verified that the cross-linked portion present in the web did not prevent the subsequent melting of the web.

Indeed, the fact that the web retains a hot-melt character is necessary for its later connection to the unidirectional, and during lay-up, in particular for making the preform.

The web's melting behavior after irradiation was observed using DSC, according to ISO Standard 11357-3. The curves obtained and presented in FIG. 9 show that irradiation by beta electron beam leads to a slight difference in terms of the web's melting point, but this occurs at around 100° C. in any case. This low melting point is very advantageous in terms of time and expense, and makes it possible to lower the temperature to be used during the later lay-up step for making the preform, which in the prior art is generally performed at temperatures above 150° C.

V. Studies Performed on the Reinforcement Materials According to the Invention

1) Cross-Linking on a Webbed UD

Measurements of the cross-linking level were taken on the webbed UD with an HX2632 web laminated onto each side of the unidirectional, under the conditions listed in Table 2. The voltage applied for electron beam irradiation was 150 kV and the dose applied was 100 kGy. Since carbon fiber does not react with irradiation but may act as a barrier to rays due to its density, the influence of the treatment on only one or on both sides of the material was evaluated. The webbed UD material irradiated by electron beam (beta rays) was immersed in formic acid for 3 days, then filtered and dried in order to evaluate the cross-linking level, as described above.

The results are summarized in Table 3 below and compared to the level of cross-linking obtained by irradiating only the web. It appears that the results obtained are similar on both materials, confirming that the treatment can be performed at two different steps of the method: on only the web, upstream of its association with the unidirectional, or on the webbed UD. For the latter, however, the treatment must be performed on both sides of the material due to the density of the reinforcement fibers, based on the cross-linking mode used (irradiation under electron beam). In the case of gamma irradiation, a treatment on only one side is sufficient.

TABLE 3

|  | Webbed UD | Web |
| --- | --- | --- |
| 100 kGy electron beam (single side) | 22 +/− 6 | 59+/− |
| 100 KGy electron beam (both sides) | 67 +/− 5 |  |

2) Lay-Up and Preforming 2.1) Lay-Up

The depositing of the webbed UD is performed continuously with application of pressure perpendicular to the depositing surface in order to apply it to this surface. Such methods, known as AFP (Automated Fiber Placement) or ATL (Automated Tape Lay-up) are described, e.g., in documents WO2014/076433 A1 or WO 2014/191667 and illustrated in FIG. 10. Various strips of intermediate material are placed one atop the other along parallel placement trajectories, so as to form plies $200_1$, $200_2$, etc. The device 300 activates the thermoplastic material (web, powder, etc.); that is it uses the hot-melt character of the material and is integrated into the placement unit 400. The latter is moved in order to place the various strips of material that are cut out at the end of the path. When a ply is fully placed, the orientation is modified in order to place the following ply along a placement path that is different from the previous ply. Each strip is placed parallel to the previous strip, with no space between the strips and with adhesive over the entire surface.

Such a method has been successfully used with the materials according to the invention. In particular, the following conditions were used:

Webbed UD reinforcement materials used: unidirectional laminated on both of its faces with an HX2632 web, then subjected to 50 kGy Beta radiation or to 100 kGy Beta radiation, on each of its faces. Placement power and speed ensured by a FANUC M16iB machine, sold by the FANUC company (Japan).

TABLE 4

|  | Placement power (Watts) | Placement speed (mm/sec.) |
| --- | --- | --- |
| HX2632 Web | 830 | 430 |
| 1R8D04 Web | 1000 | 370 |

Orientation and number of plies: $[(45/0/90/135/0])_2$.

In the case of an activation of an epoxy-powder-type thermoset material used in the prior art, the primary advantage is the material's activation temperature, which is around 100° C. Conversely, this type of material generally leads to soiling of the placement unit 400. This is why thermoplastic materials, e.g., in web form (such as those cited in WO 2010/046609), are generally preferred, but those used in the prior art activate at temperatures above 150° C.

The webbed UD reinforcement material of the invention with an HX2632 web proposes to address the issue of the material's activation at temperatures below 150° C., even if it has a partially cross-linked thermoplastic material. In particular the webbed UD material with a cross-linked HX2632 web on each of the faces of the carbon lap can be placed at temperatures ranging from 80 to 130° C., more specifically from 100 to 120° C., which lowers by 20 to 40% the power necessary for the placement of the material in comparison with a traditional thermoplastic web and accelerates the placement speed, in particular during the many acceleration phases of the placement means (energy savings). The level of cross-linking of the thermoplastic web does not influence these results, since the residual thermoplastic portion ensures the thermal-bonding character of the material, regardless of the quantity. More specifically, the same placement parameters can be used with a thermoplastic percentage ranging from 30 to 70% by weight after cross-linking of the HX2632 web. These results confirm that the present invention enables especially advantageous placement operations on a large scale.

The quality of the material's placement was evaluated by means of a non-standard peel test used for comparative purposes. The peeling assembly is indicated in FIG. 11. To do this, two strips of webbed UD material are associated parallel to each other using the previously-specified placement power and speed. The duo thereby formed is peeled in traction at an arbitrary speed of 50 mm/min. over a distance of 200 mm (preforming distance mentioned in FIG. 11) in order to measure the generated peel force. The quality of the placement is thus evaluated by measuring the average of the peel force over 200 mm. The results presented in Table 5 compare the placement quality between a webbed UD reinforcement material with an IR8D04 thermoplastic web that is laminated on both faces and an HX2632 web treated with 50 or 100 kGy of Beta radiation, also laminated on both faces. The three webs have a grammage of 4 g/m². It is clear that, despite the irradiation treatment undergone by the HX2632 web, this in no way affects its adhesive character and it is therefore possible to produce placement qualities that are equivalent to those obtained with a pure thermoplastic web.

TABLE 5

|  | 1R8D04 | HX2632 50 kGy Beta | HX2632 100 KGy Beta |
|---|---|---|---|
| Average peel force over 200 mm (N) | 0.13 +/− 0.03 | 0.12 +/− 0.02 | 0.14 +/− 0.04 |

2.2) Preforming

Figure 12:
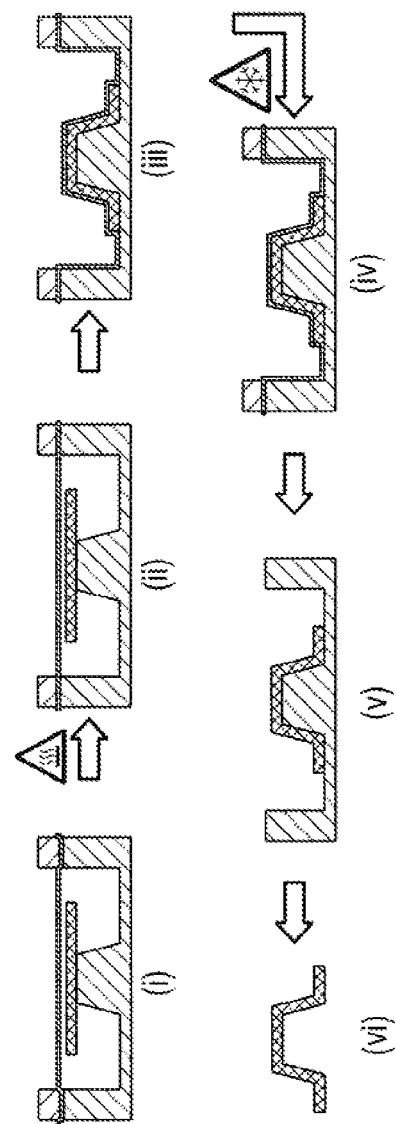
FIG. 12 illustrates, in diagram form, a preforming method for making a non-flat preform.

The multiaxial flat preform obtained in Paragraph 2.1 can subsequently undergo preforming by again using the thermobonding character of the thermoplastic material present on the unidirectional reinforcement material. To do this, the flat preform is positioned on the preforming tool at ambient temperature and a silicone vacuum bag covers the assembly, which is then heated in an oven at a temperature that activates the thermobonding character of the thermoplastic or thermoset material. A reduced pressure is then applied to enable the flat preform to be preformed according to the desired three-dimensional shape, then the assembly is cooled under reduced pressure, before the preform is recovered. The entire method is described in FIG. 12. At (i), we see a two-dimensional preform positioned on the tool, with application of the vacuum bag, at (ii), heating leads to activation of thermobonding, at (iii) there is application of the vacuum, the preforming step, followed by cooling with active vacuum at (iv) leading, after (v) and (vi), to the ready preform.

Whereas reinforcement materials such as those described in patent application WO 2010/046609 must be preformed at temperatures above 150° C., the materials of the invention made with the HX2632 web can be preformed at temperatures below 130° C., preferably below 120° C. This once again demonstrates its true utility in large-scale use for implementing the entire method at temperatures below 130° C.

Figure 13:
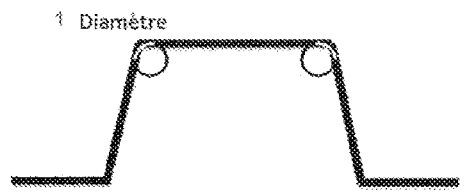
FIG. 13 shows where the diameter measurement mentioned in Table 5 is taken.

To evaluate the quality of the obtained preform, a diameter measurement is performed on it. As was done for evaluating placement quality, three webbed materials are compared: lamination with 1RD04 webs, HX2632 webs that have undergone 50 kGy of Beta radiation, and HX2632 webs that have undergone 100 kGy of Beta radiation. The preforms such as those presented in FIG. 12 were first obtained by stacking 10 unidirectional plies [(45/0/90/135/0)]$_2$ with a mass per unit area of 210 g/m$^2$. The preforming cycles, as well as the radius measurements taken on the obtained preforms, are presented in Table 6. FIG. 13 describes the site where the diameter is measured on the preform.

TABLE 6

|  | 1R8D04 | HX2632 Beta 50 KGy | HX2632 Beta 100 kGy |
|---|---|---|---|
| Preforming step | 30 min. 170° C. | 30 min. 120° C. | 30 min. 120° C. |
| Measured diameter (mm) | 20.0 | 21.3 | 22.0 |
| Theoretical diameter (mm) | 20 | | |

The results clearly show the utility of the invention, since it makes it possible to significantly lower preforming temperatures without altering the quality of the obtained preform. In the example presented, a diameter of 22 mm for a theoretical diameter of 20 mm is considered perfectly acceptable.

3) Treatment of Panels

A preform measuring 340 mm×340 mm composed of the stack sequence adapted to the carbon grammage is placed inside a press injection mold. A frame of known thickness surrounding the preform yields the desired fiber content (FC).

Four reinforcement materials are compared, two previously-described ones according to the invention and two others used in the prior art (Table 7).

TABLE 7

|  | Comparative material 1 | Comparative material 2 | Material 3 according to the invention | Material 4 according to the invention |
|---|---|---|---|---|
| Reinforcement fiber | Hexcel IMA 12K | | | |
| Porous layer | Epoxy Powder used in the Hexcel Primetex 43098 S 1020 S E01 1F | IR8D04 web | HX2632 web 50 kGy Beta irradiated after lamination (lap irradiated) | HX2632 web 100 kGy Beta irradiated after lamination (lap irradiated) |
| Mass per unit area of the reinforcement fibers of the webbed UD (g/m$^2$) | | | 210 | |

The epoxy resin sold by Hexcel Composites under the reference HexFlow RTM6 is injected at 80° C. under 2 bars through the preform, which is kept at 140° C. inside the press. The pressure applied by the press is 5.5 bars. When the preform is full and resin is coming out of the mold, the outlet pipe is closed and the polymerization cycle begins (3° C./min up to 180° C. followed by 2 hrs. of post-curing at 180° C. and cooling at 5° C./min).

Test pieces are then cut out in dimensions suitable for performing compression after impact (CAI) tests, in-plane shear (IPS) tests, open-hole compression (OHC) tests, as well as crack initiation and propagation tests (GIc and GIIc), summarized in Table 8.

TABLE 8

|  | IPS | CAI | GIc/GIIc | OHC |
|---|---|---|---|---|
| Orientation of plies in the preform | [45/135]2 s | [45/0/135/90]3 s | [0]16 | [45/0/135/90]3 s |
| Test machine | Instron 5582 | Zwick Z300 | Instron 2519 | Zwick Z300 |
| EN Standard | 6031 | 6038 | 6033/6034 | 6036 |

The results obtained for all of these tests are listed in Tables 9 to 11. In the case of the GIc and GIIc tests, obtaining a value above 700 J/m$^2$ is considered to be highly satisfactory and is obtained regardless of the material.

TABLE 9

IPS

| IPS (dry, 23° C.) | Comparative material 1 | Comparative material 2 | Material 3 according to the invention | Material 4 according to the invention |
|---|---|---|---|---|
| Stress (MPa) | 66 | 102 | 101 | 100 |
| Modulus (MPa) | 4.4 | 4.4 | 4.5 | 4.6 |

|  | Comparative material 2 | Material 4 according to the invention |
|---|---|---|
| IPS (dry, 70° C.) |  |  |
| Stress (MPa) | 71 | 71 |
| Modulus (MPa) | 3.1 | 3.8 |
| IPS (dry, 120° C.) |  |  |
| Stress (MPa) | 54 | 52 |
| Modulus (MPa) | 2.8 | 3.5 |

TABLE 10

CAI

| Standardized CAI at 60% FC (dry, 23° C.) | Comparative material 1 | Comparative material 2 | Material 3 according to the invention | Material 4 according to the invention |
|---|---|---|---|---|
| 30 J (MPa) | 126 | 259 | 262 | 255 |
| 70 J (MPa) |  | 192 | 217 | 211 |

TABLE 11

OHC

| Compression | Comparative material 1 | Comparative material 2 | Material 3 according to the invention | Material 4 according to the invention |
|---|---|---|---|---|
| OHC (MPa) | 257 | 285 | 295 | 295 |

The mechanical results presented show that in addition to the method issues described previously, to which the materials of the invention respond, these materials also make it possible to obtain composite parts with optimal properties, particularly in terms of impact resistance (CAI), mechanical properties showing hole sensitivity such as the open-hole test (OHC), in-plane shear (IPS), or crack resistance (crack initiation and propagation, GIc, GIIc).

Specifically, it is possible to obtain a post-impact compressive strength above 250 MPa under an impact of 30J.

We therefore note that, on the one hand, while the epoxy powder solves the issue of performing all of the steps of the dry preform embodiment at temperatures ranging from 80 to 130° C., it does not yield composite parts with optimal mechanical properties. Additionally, the traditional polyamide web does yield optimal mechanical properties but does not solve the issue of the low-temperature method.

Therefore, the present invention combines a method for making the dry preform at temperatures below 130° C. with optimal mechanical properties on composite parts.

4) Microcracks

Microcrack behavior is studied on a composite material whose dry preform is obtained by stacking 16 unidirectional plies [45°/0°/135°/90°]2 s with a mass per unit area of 210 g/m$^2$. The epoxy resin sold by Hexcel under the reference HexFlow RTM6 is injected at 80° C. under 2 bars through the preform, which is kept at 140° C. inside the press. The pressure applied by the press is 5.5 bars. When the preform is full and resin is coming out of the mold, the outlet pipe is closed and the polymerization cycle begins (3° C./min up to 180° C. followed by post-curing for 2 hrs. at 180° C. and cooling at 5° C./min).

Three reinforcement materials are compared, two according to the invention: materials 3 and 4 according to the invention, described previously, and one used in the prior art: comparative material 5, which is a reinforcement material similar to previously-described comparative material 2, but in which the porous layer 1R8D04 is replaced by a porous layer PA11 LMNO on each of the faces of the fiber reinforcement.

The obtained composite materials then undergo one or more hygrothermal cycles, in order to simulate the heat cycles and periods of humidity that an aeronautical part may have to withstand.

Samples measuring 50 mm×60 mm×4 mm are cut out in order to undergo the hygrothermal cycle defined below. Next, each sample is cut out again, then polished in order to count the number of cracks that appeared during the cycle.

Figure 14:
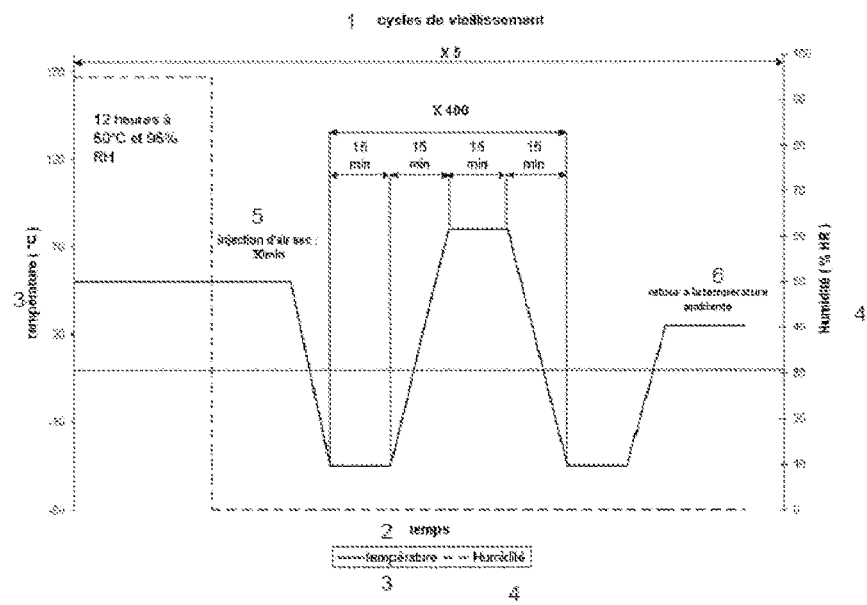
FIG. 14 shows the hygrothermal cycle used in studying the microcrack behavior reported in the examples.

Hydrothermal Cycle Presented in FIG. 14:

The Cycle Includes Several Repetitions of Two Phases:

A stationary phase for increasing humidity at 50° C. and under 95% humidity, followed by one hour of heat cycles. These heat cycles consist of a plateau lasting 15 minutes at −55° C., followed by a temperature increase lasting 15 minutes to reach 72° C., followed by a plateau lasting 15 minutes at 72° C. This plateau is followed by a new temperature change phase, returning to −55° C. This negative temperature is selected because it corresponds to what an aircraft may undergo during a subsonic flight. The positive temperature accelerates humidity desorption.

The load, due to its humidification period, causes a water concentration gradient within the sample. This concentration profile is different on the edges of the sample because the diffusion coefficients are greater in the direction of the fibers. Since the orientation of the fibers is different in each unidirectional ply, the diffusion coefficients are different as well, which generates a very complex water concentration profile on the edges of the sample. This phenomenon has been taken into account in the dimensioning of the sample and in the definition of the zone to be studied.

The hygrothermal cycles are performed inside a CTS (Climatic Testing System), model CS-70/280-15 from the Climatique et Thermique Service company (ZAC du Pujol, 13390 Auriol, France), including a system for cooling via a two-stage frigorigenic liquid release. A refrigeration unit, Type 30 RA-040-B 0327-PEE, from the Carrier company (CARRIER S.A.S. Route du Thil 01122 Montluel Cedex) circulates a considerable volume of recycled glycolized water at 10° C. inside the cooling system of the first stage of the climatic enclosure in order to ensure its operation. This type of device guarantees a cooling speed of 10° C./min even for temperatures below −50° C., which is close to the cold end of the temperature range for using the enclosure, set between 180° C. et −70° C.

The humidity inside the usable space of the enclosure is controlled and adjusted using a dew bath. A dryer was added to this device, specifically a ZANDER Type K-MTI dryer by the ZANDER company (45219 ESSEN, Germany) using dry air injection. Once the humidity level of the dryer is set at 0%, the space is considered to be fully dry.

In order to count the cracks by microscopic observation after the hygrothermal cycle, a sample preparation protocol was prepared. The only direct method for observing internal microstructures, such as microcracks, in a material is to cut out a portion and to polish the cut plane of the portion. This is a widely-used method. It consists of using diamond cloths and suspensions in order to abrade the surface to be polished with increasing fineness, in order to obtain the flatness needed for proper analysis.

Figure 15:
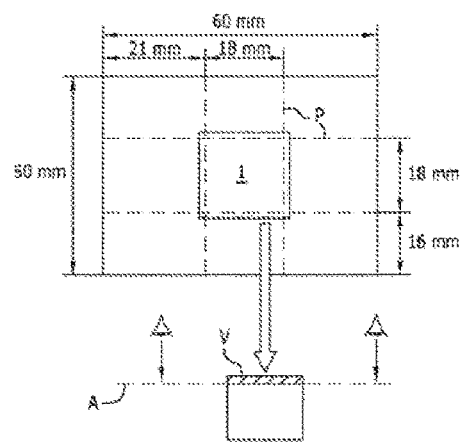
FIG. 15 shows the cutting plane used when preparing the samples in the examples in order to study any microcracks that may be present.

We opted to use samples measuring 5×6 cm². Therefore, there are two equivalent observation planes. In each sample that has undergone the hygrothermal cycle, cutouts, in accordance with FIG. 15, are made. The central sample 1 is observed on the observation planes presented in FIG. 15 after polishing.

The cutting planes P are perpendicular to the plane of the unidirectional plies. The method for polishing the sample to mirror status, which is helpful for observation, was simplified with regard to one metal, in the step using large-grain sandpaper due to its greater ductility. But a finer level of finishing, interspersed with ultrasonic bath cleaning, is necessary during the final polishing phase involving a diamond suspension.

The cutting of the samples leading to the final sample 100 is performed using a chainsaw with a silicon carbide circular blade. The cutting is carried out via gradual abrasion, with advance calibration of the blade's speed. Next, the following polishing protocol, which yields a mirror polish favorable to microscopic observation, is implemented at the cutting plane.

Polishing Protocol

The samples are coated in Resin 605 by LamPlan (acrylic resin polymerized with methyl methacrylate) and polished using an independent-pressure automatic polisher (Mecapol P320 by Presi).

To do this, the cut samples are placed on the bottom of a cylindrical mold. The surface to be polished is oriented toward the bottom of the mold. The mold is then filled with a cold-coating bicomponent resin (LamPlan, 605), which polymerizes spontaneously in about 15 min. The samples are then unmolded and polished according to the described protocol.

The various polishing steps are listed in Table 12 below:

TABLE 12

| Step no. | Paper grain | Pressure per sample | Minimum time |
|---|---|---|---|
| 1 | P240 | 250 g/cm² | 40 s |
| 2 | P600 | 250 g/cm² | optional |
| 3 | P1000 | 250 g/cm² | 50 s |
| 3 min in an ultrasonic bath | | | |
| Step no. | Diamond suspension | Pressure per sample | time |
| 4 | 3 µm | 100 g/cm² | 7 min |
| 5 | 1 µm | 100 g/cm² | 5 min |

In steps 1, 2, and 3, we use, for the automatic polisher, a rotation speed of 150 rpm in counter-rotation for the plate and the maximum speed for the head (100 rpm). Impurities are rinsed away.

In steps 4 and 5, we use a rotation speed of 300 rpm in counter-rotation for the plate and the maximum speed for the head (100 rpm per minute). Impurities are removed using a lubricant applied dropwise.

Counting the cracks is then performed using analysis micrographic images obtained by a 5-megapixel digital camera (model U-TVO.5XC-2-4F04335 by OLYMPUS) mounted onto a microscope (model GX 51 F-T2 SN 4 G 0 9299 by OLYMPUS), with an ×5 lens (magnification×50). The image analysis software used is "Analysis Pro Five," sold by Olympus France SAS, Parc d'affaire Silic, 74 rue d'Arcueil BP 90165, 94533 Rungis cedex, France. For an observation of Ni fissures in the unidirectional ply i over a sample of length L with a lay-up that allows the cracks in p unidirectional plies to be clearly seen, a criterion d is defined according to the equation:

$$d = \frac{\sum_i Ni}{L \times p}$$

The p factor corresponds to the total number of unidirectional plies of the laminate minus the number of unidirectional plies whose carbon fibers are parallel to the observation plane, taking into account the fact that the cracks remain invisible within these unidirectional plies.

The d factor is a linear crack density, expressed in $cm^{-1}$, which taking into account the choice of L, can be considered an intrinsic feature of the material under the relevant load.

Figure 16:
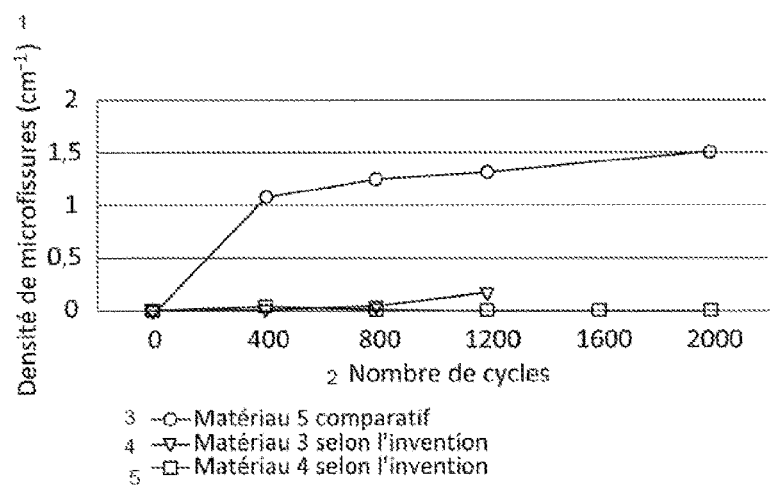
FIG. 16 shows the densities of microcracks obtained in laminates made with the materials according to the invention or the prior art.

The graphic in FIG. 16 shows the values of the d factors (referred to as crack density) obtained on various samples (given that the measurement method is destructive), after a determined number of hygrothermal cycles. It is clearly shown that the laminates in accordance with the invention have a much lower crack density, even zero density.

Figure 17:
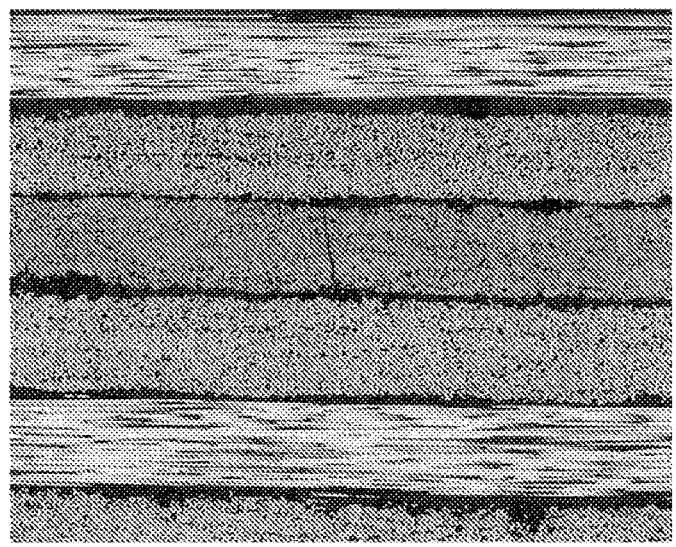
FIG. 17 is an image obtained under optical microscopy of a laminate obtained with a material of the prior art.

An image of a microcrack obtained after 400 hygrothermal cycles with the laminate of Comparative Example 23 is presented in FIG. 17.

This type of result shows another contribution of the invention: the addition of a partially cross-linked thermoplastic polymer porous layer minimizes and even eliminates the occurrence of microcracks.

B. Tests Performed Using a Powder Deposit

First, the Hylink binder was cross-linked for 30 minutes at 180° C. in an oven. Measurement of the weight of the cross-linked portion, as well as hot optical microscopy, were performed as in Parts A-I and II, in order to verify the behavior of the polymer. The content levels of cross-linked portion were measured by immersion in formic acid for 3 days at ambient temperature, then filtered and dried at 50° C. for 4 hrs. The results obtained were as follows:

initial cross-linked portion: 7%+/−3%, relative to the total weight of polymer cross-linked portion after 30 minutes at 180° C.: 60%+/− 9%, relative to the total weight of polymer.

Figure 18:
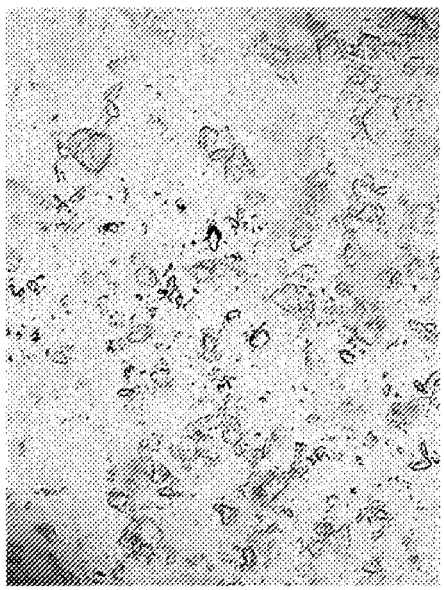
FIG. 18 shows the image obtained under electron microscopy of the Hylink powder and of the RTM6 resin placed between two glass slides, after heating to 180° C.

FIG. 18 shows the image obtained with the optical microscope at 180° C., therefore following cross-linking of the present RTM6 resin. The photo presented shows the polymer's ability to cross-link partially under the increase of temperature, which allows it to remain insoluble in the RTM6 resin, in the same way as for the HX2632 web that underwent irradiation.

Figure 19:
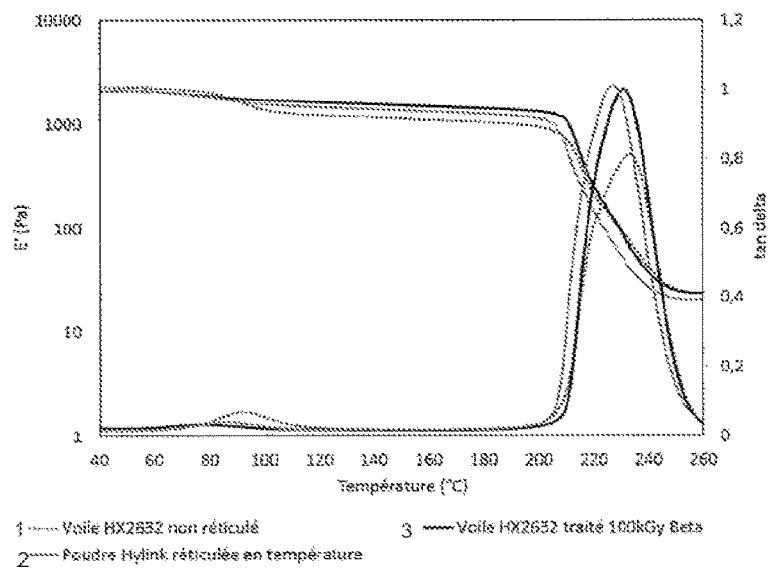
FIG. 19 shows the DMA curves obtained on various resin/web or resin/powder samples according to EN Standard 6032 (1 Hz, 1° C./min, Amplitude 15 µm).

Here again, these results can be correlated with the DMA curves on the RTM6/Hylink binder samples (following EN Standard 6032). The samples were pre-polymerized at 120° C. for 45 minutes, followed by 2 hours of post-curing at 180° C. As the results presented in FIG. 19 show, the cross-linking treatment at the temperature applied to the Hylink binder has considerable influence on the DMA results: by increasing the level of cross-linking, it is possible to maintain the thermomechanical performance of the material in the same way as for the HX2632 web. Consequently, the thermoplastic contribution is negligible, which confirms the microscopy observations.

The invention claimed is:

1. A planar reinforcement material comprising at least one fiber reinforcement, said material having on at least one of its faces a polymer porous layer, said polymer porous layer(s) representing from 2 to 6% of the total weight of the reinforcement material, said polymer porous layer(s) comprising partially cross-linked thermoplastic polymer;

wherein the cross-linked portion of said polymer porous layer(s) is from 30 to 70% by weight of the weight of the polymer porous layer;

wherein the partially cross-linked portion of the polymer porous layer(s) has a melting point within the range of from 80 to 120° C.; and wherein said partially cross-linked polymer is a semi-crystalline polymer.

2. The reinforcement material according to claim 1, characterized in that the partially cross-linked thermoplastic polymer is obtained by cross-linking cross-linkable functions under the action of heat or radiation, with said cross-linking not requiring a chemical catalyst.

3. The reinforcement material according to claim 1, characterized in that the partially cross-linked thermoplastic polymer is obtained by cross-linking a branched copolyamide with unsaturated ends composed of:

at least one unit originating from a multifunctional monomer (A) selected from diethylene triamine, pentaerythritol, mellitic acid, and 2,2-dimethylolpropionic acid, with at least the chain formations resulting from condensation in the presence of at least one unsaturated monoacid used as a chain limiter, and either at least two alpha,omega-aminocarboxylic acids that do not have the same number of carbon atoms, or at least two lactams that do not have the same number of carbon atoms, or at least one lactam, at least one carboxylic diacid, and at least one diamine, or one lactam and/or one alpha,omega-aminocarboxylic acid that do not have the same order of carbon atoms, or one diamine and one carboxylic acid, or at least one diamine, at least one carboxylic diacid, and at least one alpha,omega-aminocarboxylic acid, the proportion of (A) being lower than 9% by weight of the assembly of (A) and of the other previously-cited monomers.

4. The reinforcement material according to claim 3, characterized in that the chain formations of the branched copolyamide with unsaturated ends include at least caprolactam and lauryllactam.

5. The reinforcement material according to claim 3, characterized in that the chain formations of the branched copolyamide with unsaturated ends include at least caprolactam, diamine hexamethylene, and adipic acid.

6. The reinforcement material according to claim 3, characterized in that the fiber reinforcement is a unidirectional layer of reinforcement fibers, a fabric of reinforcement fibers, or a stack of unidirectional layers connected together by stitching or any other physical means.

7. The reinforcement material according to claim 6, characterized in that it is composed of a stack of layers of unidirectional reinforcement fibers oriented in different directions, with at least one polymer porous layer containing a partially cross-linked thermoplastic polymer placed between two unidirectional layers of reinforcement fibers and/or on the surface of the stack.

8. The reinforcement material according to claim 7, characterized in that it is composed of a stack corresponding to a chain formation $(CM/R)^n$, with CM designating a polymer porous layer including or composed of a partially cross-linked thermoplastic polymer and R being a fiber reinforcement and n designating an integer, with all of the CM layers that have an identical grammage.

9. The reinforcement material according to claim 7, characterized in that it is composed of a stack corresponding to a chain formation $(CM/R)^n/CM$, with CM designating a polymer porous layer including or composed of a partially cross-linked thermoplastic polymer and R being a fiber reinforcement and n designating an integer, with all of the external polymer porous layers including or composed of a partially cross-linked thermoplastic polymer having a grammage equal to the half-grammage of each of the inner polymer porous layers including or composed of a partially cross-linked thermoplastic polymer.

10. The reinforcement material according to claim 7, characterized in that the porous layer(s) present is/are a porous film, a grid, a powder deposit, a fabric, or a nonwoven or web.

\* \* \* \* \*